Patented Jan. 15, 1946

2,393,080

UNITED STATES PATENT OFFICE 2,393,080

CHARGE PREPARATION

Robert K. Waring, Palmerton, Pa., assignor to The New Jersey Zinc Company, New York, N. Y., a corporation of New Jersey No Drawing. Application March 10, 1944, Serial No. 525,970

1 Claim. (Cl. 75—67)

This invention relates to charge preparation and more particularly to the preparation of a briquetted charge of calcined dolomite and ferrosilicon for use in the production of magnesium. The invention contemplates an improvement in the wet briquetting of such a charge. More generally the invention contemplates an improvement in the calcination of dolomite or equivalent magnesium-bearing material.

In the production of magnesium by pyrometallurgical reduction or smelting of magnesium oxide (magnesia) in calcined dolomite (or equivalent magnesiferous material) by ferrosilicon (or equivalent reducing agent), it is customary to briquet the mix (magnesiferous material and reducing agent). In a particularly advantageous wet process of briquetting the mix (disclosed in the copending patent application of Messrs. Wagner, Fetterolf, Waring and Mahler, Ser. No. 525,969 filed Mar. 10, 1944), the calcined dolomite (calcine) is slacked with sufficient water to provide water of hydration and to provide free water to yield a plastic mix of good briquetting consistency. The plastic mix is preferably densified, and then briquetted (or otherwise appropriately agglomerated), dried at a temperature of 100–110° C., and dehydrated (calcined) at a temperature of 650–750° C. "Pillow-block" shaped briquets about 2 inches by 2 inches by 1¼ inch are now commonly used in magnesium smelting in metal retorts about 10 inches internal diameter with about 5 feet of the retort length externally heated to a temperature of 1150–1250° C. It is desirable that the briquets be as dense as possible in order to increase the weight of charge that can be introduced into the reducing retorts, thereby increasing the yield of magnesium per retort per cycle, the operating being of the intermittent or batch type.

In the aforementioned wet process of briquetting the mix, the hydration of the calcium oxide (lime) and magnesium oxide in the calcine decreases the density of the briquets after drying and dehydration. In the case of certain dolomites, particularly those that are highly crystalline, both the lime and magnesia in the calcined dolomite are hydrated (i. e. converted to calcium hydrate or hydroxide and magnesium hydrate or hydroxide) when moistened with sufficient water. The briquets obtained from such calcined dolomites are of relatively low density say from 1.35 to 1.4 grams per cc., as compared with briquet densities of 1.55 to 1.7 obtained with calcined dolomites in which only the lime, and little or no magnesia, hydrates.

I have discovered that a calcined dolomite containing inactive magnesia that does not hydrate when moistened with water can be obtained, even from highly crystalline dolomite, by adding calcium chloride to the dolomite either before calcination or during an early stage of calcination. I have further discovered that calcining the dolomite in the presence of sodium chloride, in lieu of calcium chloride, effects a partial, but nevertheless advantageous, inhibition of hydration of the magnesia in the calcine. Based on those discoveries, my present invention involves the improvement in calcining dolomite (or equivalent magnesium-bearing material) to produce a calcine in which the magnesia is substantially non-hydratable when moistened with water which comprises carrying out the calcination in the presence of calcium chloride. More especially the invention contemplates the improvement in the aforementioned wet process of briquetting a mixture of calcined dolomite and ferrosilicon, which comprises calcining the dolomite in the presence of calcium chloride or sodium chloride. The agent (calcium chloride or sodium chloride) may be added to the dolomite before calcination or during the early stages of calcination, in amount of from 0.25 to 1% by weight based on the weight of the calcine, or from about 0.1 to about 0.5% based on the weight of the stone (uncalcined dolomite). The calcium chloride or sodium chloride may be advantageously added to the dolomite in the form of an aqueous solution sprayed on the stone before calcination. Either chloride may, however, be added in dry form to the dolomite.

In order to obtain the best results it is desirable to hold to a minimum the water of plasticity, that is the water added in excess of that required for hydration in order to impart sufficient plasticity to the mix for briquetting. Thus, in practice much higher densities have been obtained with 8% water of plasticity than with 13%; the percentage figures being the quotient obtained by dividing the weight of the water lost in drying the wet briquets (at a temperature of 100–110° C.) by the initial weight of the wet briquets.

In the case of sodium chloride, about 85 to 100% of the chloride is volatilized during calcination. In general, the use of calcium chloride is to be preferred since calcium chloride almost completely inhibits the hydration of magnesia while the inhibition brought about by sodium chloride is only partial.

The following table gives two practical examples of the invention contrasted with wet-briquetting of the same dolomite calcined in the absence of either sodium chloride or calcium chloride:

| Per cent addition of agent to dolomite | Loss of water in dehydration | Density of dehydrated briquet |
|---|---|---|
| | Per cent | Grams per cc. |
| None | 24 | 1.3 –1.4 |
| 1 NaCl* | 21 | 1.55 |
| 1 CaCl₂* | 17 | 1.7 |

*Based on the weight of the calcine.

The percent of water lost in dehydration is the quotient obtained by dividing the weight of water lost in dehydrating the dried hydrated briquets (at a temperature of 650–750° C.) by the initial weight of the dried briquets, and thus measures the amount of hydration.

The briquets were prepared by the hereinbefore mentioned process of wet briquetting, and contained stoichiometric equivalents of silicon (in the ferrosilicon) and magnesia (in the calcine), namely 28 parts silicon by weight per 80 parts magnesia by weight. They were dried at a temperature of 100–110° C. to remove the water of plasticity, and then heated or calcined at a temperature of 650–750° C. to remove the water of hydration. When the briquets (of the hereinbefore mentioned almond-shape) made from dolomite calcined in the presence of either calcium chloride or sodium chloride were reduced by the customary magnesium smelting process, the reduction and condensation of magnesium vapor proceeded as usual and neither the sodium chloride nor the calcium chloride had any harmful effect on the reaction.

It will be understood that the hydrated plastic mix may be formed into agglomerates by methods other than briquetting, as for example by extrusion etc. For convenience such methods of agglomerating are herein included under briquetting.

I claim:

A method of preparing briquets of calcined dolomite and ferrosilicon, comprising calcining the dolomite in admixture with a compound selected from the group consisting of calcium chloride and sodium chloride, slacking the calcined dolomite with sufficient water to provide water of hydration at least for the calcium oxide and sufficient free water to yield a plastic mix, the said compound effecting a substantially complete inhibition of the hydration of the magnesia whereby less water is required to form the plastic mix, mixing the slacked dolomite with ground ferrosilicon, briquetting the resulting mixture of slacked dolomite and ferrosilicon, and dehydrating the briquets.

ROBERT K. WARING.